(12) United States Patent
Zhao (10) Patent No.: US 10,073,587 B2
(45) Date of Patent: Sep. 11, 2018

(54) INFORMATION PROMPT METHOD AND ELECTRONIC APPARATUS

(71) Applicants: Beijing Lenovo Software, Ltd., Haidian District, Beijing (CN); Lenovo (Beijing) Co., Ltd., Haidian District, Beijing (CN)

(72) Inventor: Qian Zhao, Beijing (CN)

(73) Assignees: BEIJING LENOVO SOFTWARE LTD., Haidian District, Beijing (CN); LENOVO (BEIJING) CO., LTD, Haidian District, Beijing (CN)

( * ) Notice: Subject to any disclaimer, the term of this patent is extended or adjusted under 35 U.S.C. 154(b) by 286 days.

(21) Appl. No.: 14/281,188

(22) Filed: May 19, 2014

(65) Prior Publication Data

US 2014/0359534 A1 Dec. 4, 2014

(30) Foreign Application Priority Data

May 29, 2013 (CN) .......................... 2013 1 0206619
Aug. 12, 2013 (CN) .......................... 2013 1 0349791

(51) Int. Cl.
*G06F 3/048* (2013.01)
*G06F 3/0481* (2013.01)
*G06F 3/0487* (2013.01)

(52) U.S. Cl.
CPC ........ *G06F 3/04817* (2013.01); *G06F 3/0481* (2013.01); *G06F 3/0487* (2013.01)

(58) Field of Classification Search
CPC ..................................................... G06F 3/048
See application file for complete search history.

(56) References Cited

U.S. PATENT DOCUMENTS 6,944,472 B1    9/2005   Ishigami
8,339,377 B1 *   12/2012   Cselle ................... G06F 1/3209
                                                                                        340/815.4

(Continued)

FOREIGN PATENT DOCUMENTS

CN         1270468 A     10/2000
CN         1717650 A      1/2006

(Continued)

OTHER PUBLICATIONS

Office Action, and English language translation thereof, in corresponding Chinese Application No. 201310206619.3 dated Nov. 4, 2016, 11 pages.

(Continued)

*Primary Examiner* — Xuyang Xia
(74) *Attorney, Agent, or Firm* — Brinks Gilson & Lione; John C. Freeman (57) ABSTRACT

An electronic apparatus that includes at least a first element and a sensor and an information prompt method for the electronic apparatus are described. The method includes judging whether a predetermined posture of the electronic apparatus changes or not by a sensor to obtain a first judgment result; generating a first prompt information for prompting a first position where the first element is disposed, when the first judgment result indicates that the predetermined posture of the electronic apparatus has changed; outputting the first prompt information, to enable a user to determine the first position according to the first prompt information, and to operate the first element.

18 Claims, 4 Drawing Sheets

(56) References Cited

U.S. PATENT DOCUMENTS

| | | | |
|---|---|---|---|
| 2004/0100511 A1 | 5/2004 | Wong et al. | |
| 2006/0197753 A1 | 9/2006 | Hotelling | |
| 2013/0246949 A1* | 9/2013 | Kikuchi | G06F 3/0484 715/765 |
| 2014/0115455 A1* | 4/2014 | Kim | G06F 3/0482 715/702 |
| 2014/0210703 A1* | 7/2014 | Narasimhan | G06F 21/36 345/156 |
| 2016/0011775 A1* | 1/2016 | Guo | G06F 3/04817 715/765 |

FOREIGN PATENT DOCUMENTS

| | | |
|---|---|---|
| CN | 1783904 A | 6/2006 |
| CN | 1959616 A | 5/2007 |
| CN | 101031116 A | 9/2007 |
| CN | 101211250 A | 7/2008 |
| CN | 101432677 A | 5/2009 |
| CN | 102221873 A | 10/2011 |
| CN | 203026422 U | 6/2013 |
| WO | WO 02/13001 A2 | 2/2002 |

OTHER PUBLICATIONS

Office Action, and English language translation thereof, in corresponding Chinese Application No. 201310349791.4, dated Mar. 6, 2017, 10 pages.

Second Office Action (23 pages including English translation) dated May 19, 2017 out of Chinese priority Application No. 201310206619.3.

Third Office Action (55 pages including English translation) dated Dec. 4, 2017 in the corresponding Chinese priority Application No. 201310206619.3.

Fourth Office Action dated Jun. 25, 2018 (40 pages including English translation) out of Chinese priority Application No. 201310206619.3.

Article, Touch Button, Slider, Touch Panel and Touch Screen, *Touch Sensing Technology and the Application thereof Based on CaoSense*, Xiaoping Weng, Beihang University Press, pp. 61-77, Jan. 2010 (20 pages including English translation).

Article, "Fingerprint Technology", *Manual for Perfectly Playing with Thumb*, Qiao Kang, Shanghai University Press, p. 317, Aug. 2003 (2 pages including English translation).

* cited by examiner

INFORMATION PROMPT METHOD AND ELECTRONIC APPARATUS

BACKGROUND

This application claims priority to Chinese patent application No. 201310206619.3 filed on May 29, 2013 and Chinese patent application No. 201310349791.4 filed on Aug. 12, 2013; the entire contents of which are incorporated herein by reference.

SUMMARY

The present application relates to a field of electronics, and more particularly, to information prompt method and an electronic apparatus.

With the development of science and technology, more and more electronic apparatuses come into human life, bringing a lot of convenience. Among them, the tablet PC is a favorite of the majority of users, due to its slim shape, stylish appearance, powerful function, easy operation, and other advantages.

The tablet PC in the prior art is generally square, having four sides, with a power button provided on one of the sides. When the tablet PC is in a standby state, the user can trigger the power button, to enable the tablet PC to enter into an operation state from the standby state.

However, the inventor of the present application finds that the above technology at least has a technical problem below in the process of implementing technical solutions.

In the tablet PC in the prior art, because the power button thereof is designed relatively small, the size of the tablet PC is designed relatively large, and the four sides of the tablet PC are designed almost in the same shape, when the user needs to use the power button disposed on one of the four sides, it is difficult for the user to find the power button. Typically, the user needs to pick up the Tablet PC, trying to find along the four sides of the tablet PC in turn; especially in a dark environment, it is more difficult for the user to find the power button. In addition, volume buttons are provided on the right edge of the tablet PC, and a black-screen button is provided on the upper edge of the tablet. After randomly rotating the tablet PC, the user feels very hard to judge positions of the volume buttons or the black-screen button at this time, which brings the user inconvenience.

In summary, the tablet PC in the prior art, due to the design thereof, has the technical problem that the buttons are not easily found by the user.

Embodiments of the present application provide an information prompt method and an electronic apparatus, which solve the technical problem of the tablet PC in the prior art that the buttons are not easily found by the user.

In one aspect, the present application provides a technical solution below by an embodiment thereof:

An information prompt method is applied to an electronic apparatus, the electronic apparatus at least including a first element and a sensor, and the method comprises: judging whether a predetermined posture of the electronic apparatus changes or not by a sensor to obtain a first judgment result; generating a first prompt information for prompting a first position where the first element is disposed, when the first judgment result indicates that the predetermined posture of the electronic apparatus has changed; outputting the first prompt information, to enable a user to determine the first position according to the first prompt information, and to operate the first element.

Preferably, the first element is specifically a power button, wherein, when the electronic apparatus is in a standby state, the user enables the electronic apparatus to enter into an operation state from the standby state by triggering the power button.

Preferably, the judging whether a predetermined posture of the electronic apparatus changes or not by a sensor to obtain a first judgment result includes: obtaining a first posture of the electronic apparatus by the sensor at a first moment; obtaining a second posture of the electronic apparatus by the sensor at a second moment after the first moment; judging whether the first posture is a first predetermined posture or not and whether the second posture is a second predetermined posture or not, to obtain the first judgment result.

Preferably, the generating the first prompt information for prompting the first position where the first element is disposed when the first judgment result indicates that the predetermined posture of the electronic apparatus has changed, specifically includes: judging whether the electronic apparatus is in the standby state or not to obtain a second judgment result, when the first judgment result indicates that the first posture is the first predetermined posture and the second posture is the second predetermined posture; generating the first prompt information, when the second judgment result indicates that the electronic apparatus is in the standby state.

Preferably, the first prompt information is specifically at least one of the following information: a first light prompt information output by a light-emitting unit disposed in a second position, a first distance between the second position and the first position being equal to or less than a first predetermined distance; a first vibration prompt information output by a vibration unit disposed in a third position, a second distance between the third position and the first position being equal to or less than a second predetermined distance; and a first image prompt information output by a display unit disposed in the electronic apparatus.

In another aspect, the present application provides an electronic apparatus below by an embodiment, the electronic apparatus comprises: a first element; a sensor for obtaining a posture of the electronic apparatus; a processor, connected to the sensor, for judging whether a predetermined posture of the electronic apparatus changes or not by the sensor to obtain a first judgment result, and generating a first prompt information for prompting a first position where the first element is disposed, when the first judgment result indicates that the predetermined posture of the electronic apparatus has changed; an output device connected to the processor, for outputting the first prompt information, to enable a user to determine the first position according to the first prompt information, and to operate the first element.

Preferably, the first element is specifically a power button, wherein, when the electronic apparatus is in a standby state, the user can enable the electronic apparatus to enter into an operation state from the standby state by triggering the power button.

Preferably, the processor is specifically used for: obtaining a first posture of the electronic apparatus by the sensor at a first moment; obtaining a second posture of the electronic apparatus by the sensor at a second moment after the first moment; judging whether the first posture is a first predetermined posture or not and whether the second posture is a second predetermined posture or not, to obtain the first judgment result.

In addition, the processor is further used for: judging whether the electronic apparatus is in the standby state or not to obtain a second judgment result, when the first judgment result indicates that the first posture is the first predetermined posture and the second posture is the second predetermined posture; generating the first prompt information, when the second judgment result indicates that the electronic apparatus is in the standby state.

Preferably, the processor is further used for: controlling the output device to output the first prompt information, after the generation of the first prompt information.

Preferably, the output device is specifically at least one of the follows: a light-emitting diode, disposed in a second position of the electronic apparatus, for outputting the first light prompt information when the first prompt information is a first light prompt information, wherein, a first distance between the second position and the first position is equal to or less than a first predetermined distance; a vibrator, disposed in a third position of the electronic apparatus, for outputting the first vibration prompt information when the first prompt information is a first vibration prompt information, wherein, a second distance between the third position and the first position is equal to or less than a second predetermined distance; and a display screen embedded in a surface of the electronic apparatus, for outputting the first image prompt information when the first prompt information is a first image prompt information.

In still another aspect, an embodiment of the present application provides an electronic apparatus, which may comprise: a display screen; a physical button disposed in a periphery of the electronic apparatus; a sensor, for detecting whether a predetermined touch operation is received in a predetermined position of the electronic apparatus or not; and a display screen control means, for displaying a first display content on the display screen when it is detected that the predetermined touch operation is received in the predetermined position of the electronic apparatus, the first display content being used for indicating a position of the physical button on the electronic apparatus.

In the electronic apparatus according to the still another aspect, the sensor may be a touch detector disposed in the predetermined position of the electronic apparatus; the predetermined position may include at least one of: the periphery of the electronic apparatus, at least a portion of a rear surface of the electronic apparatus, upper and lower edges of the electronic apparatus; right and left edges of the electronic apparatus; and the predetermined touch operation may include at least one of: a touch operation from left to right, a touch operation from right to left, a touch operation from top to bottom, and a touch operation from bottom to top.

One or more of the technical solutions provided by the embodiments of the present application at least have technical effects or advantages below:

1. In one embodiment of the present application, an information prompt method is disclosed, which is applied to an electronic apparatus, the electronic apparatus at least including a first element and a sensor, and the method comprises: judging whether a predetermined posture of the electronic apparatus changes or not by a sensor to obtain a first judgment result; generating a first prompt information for prompting a first position where the first element is disposed, when the first judgment result indicates that the predetermined posture of the electronic apparatus has changed; outputting the first prompt information, to enable a user to determine the first position according to the first prompt information, and to operate the first element. Wherein, the electronic apparatus may be a tablet PC, and the first element may be a power button disposed on one side of the tablet PC, which thereby effectively solve the technical problem that the power button is not easily found by the user in the tablet PC in the prior art, achieve the technical effect of informing the user of the position of the power button by the first prompt information, so that the user can rapidly find the power button according to the first prompt information.

2. In one embodiment of the present application, the first prompt information is specifically: a first light prompt information output by a light-emitting unit and/or a first vibration prompt information output by a vibration unit and/or a first image prompt information output by a display unit disposed in the electronic apparatus, which, thereby, achieves the technical effect of bringing different prompt experiences to the user by vision or by touch, so that the user can rapidly find the power button according to the first prompt information.

3. The display screen of the electronic apparatus is triggered to indicate a position of the physical button, by detecting a predetermined touch movement of the user in a predetermined position, so that the user can easily identify the position of the physical button, and thereby the procedure of viewing or touching edge by edge to find the physical button is omitted.

DETAILED DESCRIPTION

The embodiments of the present application provide an information prompt method and an electronic apparatus, which solve the technical problem that a power button is not easily found by a user in a tablet PC in the prior art.

In order to solve the above mentioned technical problem, the general idea of the technical solutions of the embodiments of the present application is as follows:

An information prompt method is applied to an electronic apparatus, the electronic apparatus at least including a first element and a sensor, and the method comprises steps as follows.

Firstly, it is judged whether a predetermined posture of the electronic apparatus changes or not by a sensor to obtain a first judgment result.

Secondly, a first prompt information for prompting a first position where the first element is disposed is generated, when the first judgment result indicates that the predetermined posture of the electronic apparatus has changed.

Finally, the first prompt information is output, to enable a user to determine the first position according to the first prompt information, and to operate the first element.

To better understand the above technical solutions, the above-mentioned technical solutions are described in detail in conjunction with the accompanying drawings and the specific embodiments below.

Example One

Figure 1:
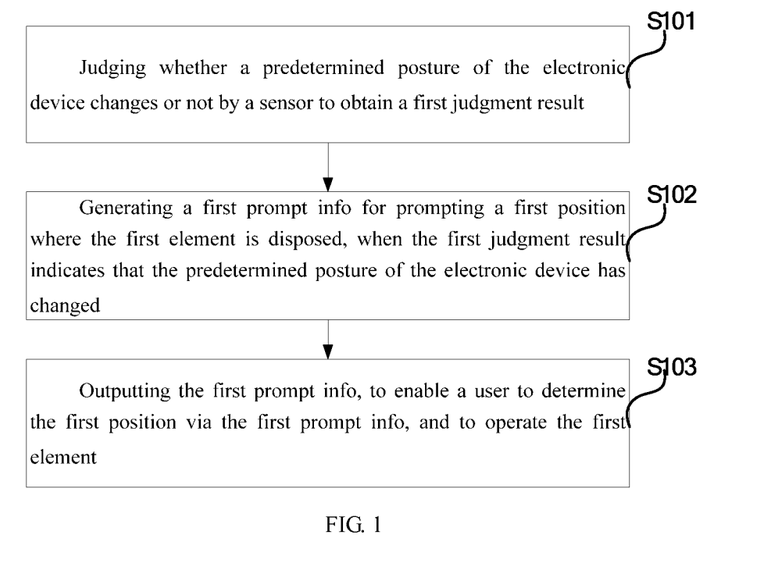
FIG. 1 is a flowchart of an information prompt method according to Embodiment One of the present application.

As shown in FIG. 1, an information prompt method is applied to an electronic apparatus, the electronic apparatus at least including a first element and a sensor, and the method comprises:

In step S101, it is judged whether a predetermined posture of the electronic apparatus changes or not by a sensor, to obtain a first judgment result;

In step S102, a first prompt information for prompting a first position where the first element is disposed is generated, when the first judgment result indicates that the predetermined posture of the electronic apparatus has changed;

In step S103, the first prompt information is output, to enable a user to determine the first position via the first prompt information, and to operate the first element.

In the specific implementation process, the electronic apparatus may be a tablet PC, a smart phone, a digital camera or any other portable electronic apparatus. The embodiments of the present application do not specifically limit the specific type of the electronic apparatus.

In the specific implementation process, the first element is disposed in the first position on the surface of the electronic apparatus, and the first position may be any position on the surface of the electronic apparatus. The embodiments of the present application do not specifically limit the first position.

Further, the first element may be a power button; wherein, when the electronic apparatus is in a standby state, the user enables the electronic apparatus to enter into an operation state from the standby state by triggering the power button.

In the specific implementation process, the first element is not limited to a power button, but may further be: a volume adjustment button, a shooting shortcut key, a headset jack, a charging jack, etc. The embodiments of the present application do not specifically limit which specific type of element or device the first element is.

The present application is described in detail when the first element is the power button.

The step S101 specifically includes: at a first moment, a first posture of the electronic apparatus is obtained by the sensor; at a second moment after the first moment, a second posture of the electronic apparatus is obtained by the sensor; it is judged whether the first posture is a first predetermined posture or not and whether the second posture is a second predetermined posture or not, to obtain the first judgment result.

In the specific implementation process, the sensor may be: a gyroscope and/or a gravity sensor, etc., for obtaining relevant electrical parameters of the posture of the electronic apparatus. Here, the sensor is not limited to a gyroscope and/or a gravity sensor. The embodiments of the present application do not specifically limit the specific type of the sensor.

Further, the step S102 specifically includes operations as below. It is judged whether the electronic apparatus is in the standby state or not to obtain a second judgment result, when the first judgment result indicates that the first posture is the first predetermined posture and the second posture is the second predetermined posture. The first prompt information is generated, when the second judgment result indicates that the electronic apparatus is in the standby state.

In the specific implementation process, at a first moment, a first electrical parameter indicating the current posture of the electronic apparatus is obtained by the sensor; at a second moment, a second electrical parameter indicating the current posture of the electronic apparatus is obtained by the sensor.

In the specific implementation process, the first predetermined posture and the second predetermined posture are different postures, wherein, the electronic apparatus further stores a first predetermined electrical parameter for indicating the first predetermined posture and a second predetermined electrical parameter for indicating the second predetermined posture. When it is judged that a first power parameter is the same as the first predetermined electrical parameter, and a second power parameter is the same as the second predetermined electrical parameter, that is, it is judged that the first posture is the first predetermined posture, and the second posture is the second predetermined posture. Further, whether the electronic apparatus is in the standby state is judged. If so, a first prompt information is generated and output, to enable the user to find the power button in the first position by the first prompt information, and to trigger the power button, so that the electronic apparatus wakes up to enter into an operation state.

In the specific implementation process, the change of the predetermined posture may be any form of posture change, namely, as long as the posture of the electronic apparatus changes, step S101 may be executed, i.e., "a first prompt information for prompting a first position where the first element is disposed is generated". For example: when a user picks up the electronic apparatus which is placed statically on a desktop, the first prompt information is directly generated. In this process, the pick-up operation of the user causes a change in posture of the electronic apparatus (e.g., the occurrence of inclination or rollover), and the electronic apparatus detects the posture change by the gravity sensor and/or the gyroscope, which further generates and outputs the first prompt information.

Further, the first prompt information specifically has three forms as bellows.

As a first type, the first prompt information is specifically a first light prompt information output by a light-emitting unit disposed in a second position of the electronic apparatus, a first distance between the second position and the first position being equal to or less than a first predetermined distance.

In the specific implementation process, the light-emitting unit is adjacent to the first element closely, the first light prompt information may be a steady light or a flashing light emitted by a light-emitting unit, and the light-emitting unit may be: a blue Light-Emitting Diode (LED), a red LED, a green LED, etc. The embodiments of the present application do not specifically limit the specific form of the first light info, and the specific color of the LED unit. When the user sees the first light prompt information emitted by the light-emitting unit, he/she can find the first element adjacent to the light-emitting unit. Thus, the first predetermined distance may be: 1 cm, 2 cm, etc. Here, the first predetermined distance is not specifically limited, and all cases belong to the protection scope of the present application, as long as the user can easily see the distance scope of the first element when seeing the light-emitting unit.

As a second type, the first prompt information is specifically a first vibration prompt information output by a vibration unit disposed in a third position, a second distance between the third position and the first position being equal to or less than a second predetermined distance.

In the specific implementation process, the vibration unit can be: a vibration motor. The first vibration prompt information may be: a sustained vibration, an intermittent vibration etc., sent by the vibration unit. The embodiments of the present application do not specifically limit the specific form of the first vibration prompt information. The vibration unit is adjacent to the first element closely. When the user feels the first vibration prompt information sent by the vibration unit, he/she can find the first element adjacent to the vibration unit. Thus, the second predetermined distance may be: 1 cm, 2 cm, etc. Here, the second predetermined distance is not specifically limited, and all cases belong to the protection scope of the present application, as long as the user can easily see the distance scope of the first element when feeling the vibration unit.

A third type is a first image prompt information output by a display unit disposed in the electronic apparatus.

In the specific implementation process, the first image prompt information may be: a light emitted by a display unit on a display region adjacent to the first element; or an "arrow" displayed on the display unit, the "arrow" pointing to the first element.

Figure 2:
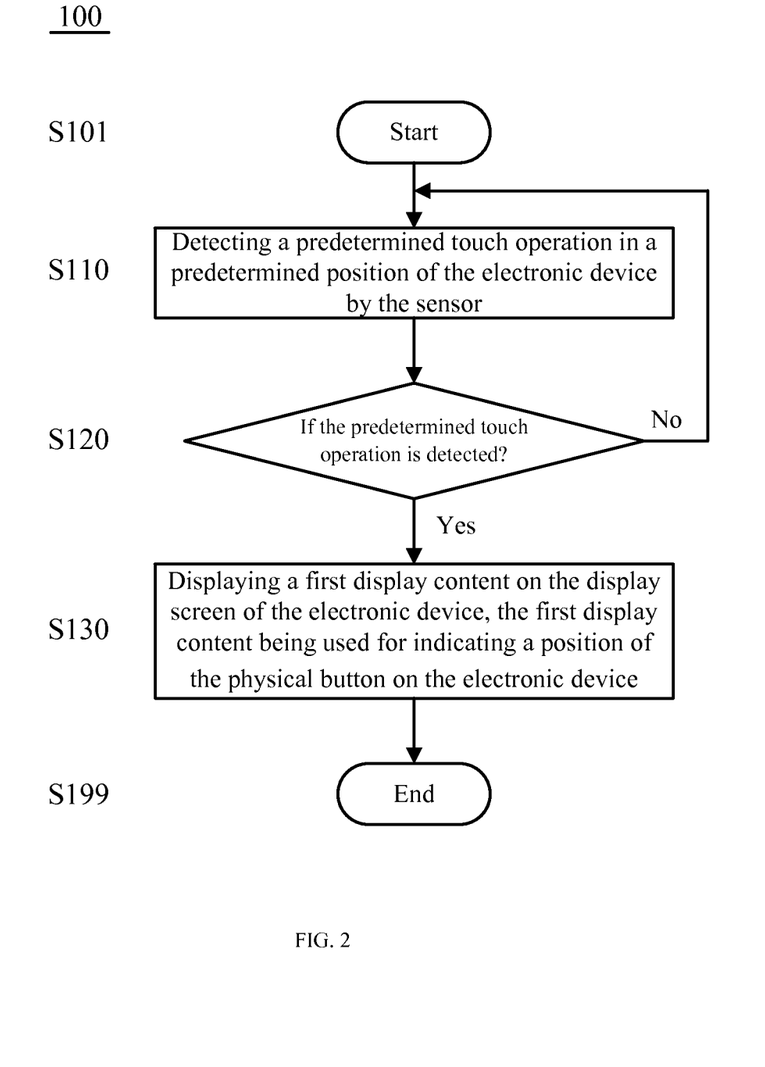
FIG. 2 schematically illustrates a flowchart of a method for prompting a position of a physical button according to an embodiment of the present application.

As shown in FIG. 2, it schematically illustrates a flowchart of a method for prompting a position of a physical button according to an embodiment of the present application. The method for prompting the position of the physical button according to the embodiment of the present application is applied to an electronic apparatus having a display screen and a sensor.

The method for prompting the position of the physical button according to the embodiment of the present application starts from the "start" step in FIG. 2.

In step S110, a predetermined touch operation in a predetermined position of the electronic apparatus is detected by the sensor.

In step S120, it is judged whether the sensor has detected that the predetermined touch operation is received in the predetermined position of the electronic apparatus or not.

When it is judged that the sensor has detected that the predetermined touch operation is received in the predetermined position of the electronic apparatus in step S120, the method for prompting the position of the physical button according to the embodiment of the present application proceeds to step S130, otherwise it returns to step S110.

In step S130, a first display content is displayed on the display screen of the electronic apparatus, the first display content being used for indicating a position of the physical button on the electronic apparatus.

Finally, the method for prompting the position of the physical button according to the embodiment of the present application comes to an end in step S199.

Below, the predetermined touch operation and detection thereof will be illustrated in detail.

For example, the sensor may be a touch sensor disposed in a predetermined position of the electronic apparatus, and the touch sensor is a capacitive sensor.

Preferably, the predetermined position may include at least one of: a periphery of the electronic apparatus, at least a portion of a rear surface of the electronic apparatus, upper and lower edges of the electronic apparatus, and right and left edges of the electronic apparatus.

Preferably, the predetermined touch operation may include at least one of: a touch operation from left to right, a touch operation from right to left, a touch operation from top to bottom, and a touch operation from bottom to top.

However, the present application is not limited to the above predetermined positions and the above predetermined touch operations. Those skilled in the art may set other detection positions and touch movements as actually required, for example, a back-and-forth touch movement in a specific detection position, for example, a touch movement from top to bottom and then from bottom to top, from bottom to top and then top to bottom, from left to right and then right to left, or from right to left and then left to right in a specific detection position.

Preferably, the physical button includes at least one of: a volume button, a forward button and a backward button of a music player, a forward button and a backward button of a radio.

When a user watches a video with the electronic apparatus, after several random rotations, it is already very difficult to directly know the specific position of the volume button on the electronic apparatus. When the user wishes to adjust the volume, he/she may touch the right edge of the electronic apparatus in the current state (the current state is the state after several random rotations) from top to bottom, from bottom to top, from top to bottom and then from bottom to top, or from bottom to top and then top to bottom. When the electronic apparatus detects such touch operation by the user, it may display the first display content on the screen of the electronic apparatus, the first display content being used for indicating a position of the physical button on the electronic apparatus.

For example, the first display content may include an appearance display corresponding to the current state of the electronic apparatus and a position indication of the physical button on the electronic apparatus.

In this case, the first display content may be displayed as a transparent image overlapped on a current display content of the electronic apparatus. Alternatively, the first display content may substitute the current display content of the electronic apparatus. Also alternatively, the display screen of the electronic apparatus may be divided to include at least a first portion and a second portion which do not overlap each other, wherein the first display content may be displayed on the first portion, and the current display content of the electronic apparatus may be displayed on the second portion. Also alternatively, the first display content may be displayed in a picture-in-picture (PIP) display mode, i.e., the first display content is displayed on the predetermined portion of the display screen of the electronic apparatus, and the current display content of the electronic apparatus is displayed on the rest portion. Also alternatively, the current display content of the electronic apparatus may be displayed in the picture-in-picture (PIP) display mode, i.e., the current display content of the electronic apparatus is displayed on the predetermined portion of the display screen of the electronic apparatus, and the first display content is displayed on the rest portion.

As another example, the first display content includes an indication mark for indicating the presence of the physical button in the edge corresponding to the physical button. Such an indication mark may include, for example, any combination of a box, a bubble, a text, a sound volume icon, a power icon, a wireless icon and the like, but the present application is not limited thereto.

In this case, the first display content may be displayed as a transparent image overlapped on the current display content of the electronic apparatus. Alternatively, the display screen of the electronic apparatus may be divided to include at least a first position and a second portion which do not overlap each other, wherein the first display content may be displayed on the first portion, and the current display content of the electronic apparatus may be displayed on the second portion. Specifically, the display screen of the electronic apparatus may be divided into two portions, in which the first portion is an outer-ring region of the display screen or a strip region of the edge (e.g., the right edge of the electronic apparatus) where the physical button is actually disposed on the electronic apparatus, and the first portion is used for displaying the first display content; and the second portion is the remaining portion on the display screen of the electronic apparatus, and is used for displaying the current display content of the electronic apparatus.

In another aspect, there may be a case that a false operation of the user is detected as the predetermined touch operation. To this end, the method for prompting a position of a physical button according to the embodiment of the present application may further comprise: removing the first display content after predetermined display duration, in a case that an operation of the physical button is not received after generation of the first display content. In this case, after the first display content is removed, the current display content of the electronic apparatus is displayed properly.

Furthermore, the method for prompting a position of a physical button according to the embodiment of the present application may further comprise other detection modes. For example, when the physical button is a volume button, a volume detector is disposed in the electronic apparatus, an output volume saltation of the electronic apparatus is detected by the volume detector, and in the case that the volume detector has detected the output volume saltation of the electronic apparatus, the first display content is displayed on the display screen, the first display content being used for indicating a position of the physical button on the electronic apparatus. The output volume saltation of the electronic apparatus includes at least one of: a volume starting from silence, a volume from small to large and the volume variation exceeding a first variation threshold value, and a volume from large to small and the volume variation exceeding a second variation threshold value.

The method for prompting a position of a physical button described in FIG. 2 is also an information prompt method. In the specific application, the information prompt method described in conjunction with FIG. 1 and the method for prompting a position of a physical button described in FIG. 2 may be combined. That is to say, the information prompt method may further comprise, in addition to steps S101, S102, and S103 described in conjunction with FIG. 1: judging whether a predetermined touch operation is received in the predetermined position of the electronic apparatus or not by a sensor, to obtain a third judgment result (corresponding to S110 in FIG. 2); generating a first display content as a first prompt information, the first display content being used for indicating a position of the physical button on the electronic apparatus, when the third judgment result indicates that the predetermined touch operation is received in the predetermined position of the electronic apparatus (corresponding to S120 and S130 in FIG. 2).

Based on the same inventive concept, another embodiment of the present application provides an electronic apparatus for implementing the information prompt method in the embodiments of the present application.

Figure 3:
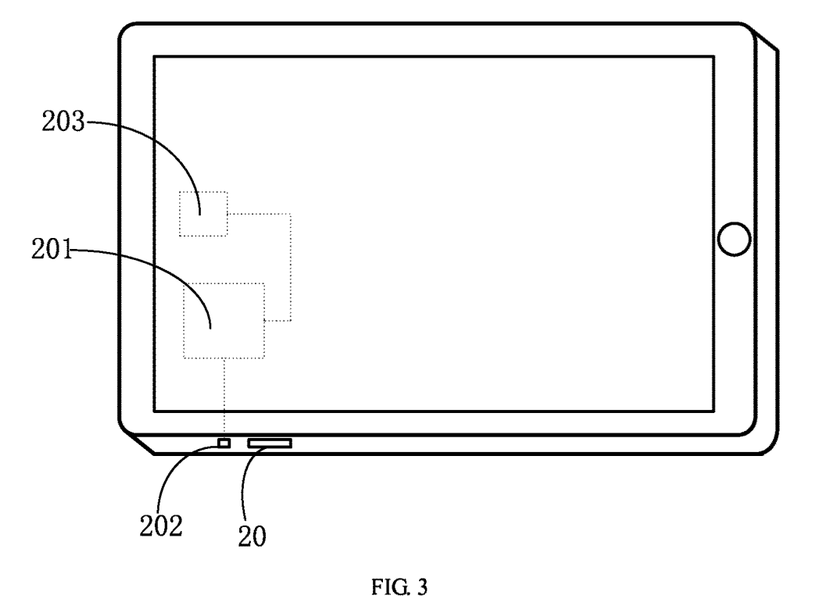
FIG. 3 is a first type of structural schematic diagram of an electronic apparatus according to Embodiment One of the present application.
Figure 4:
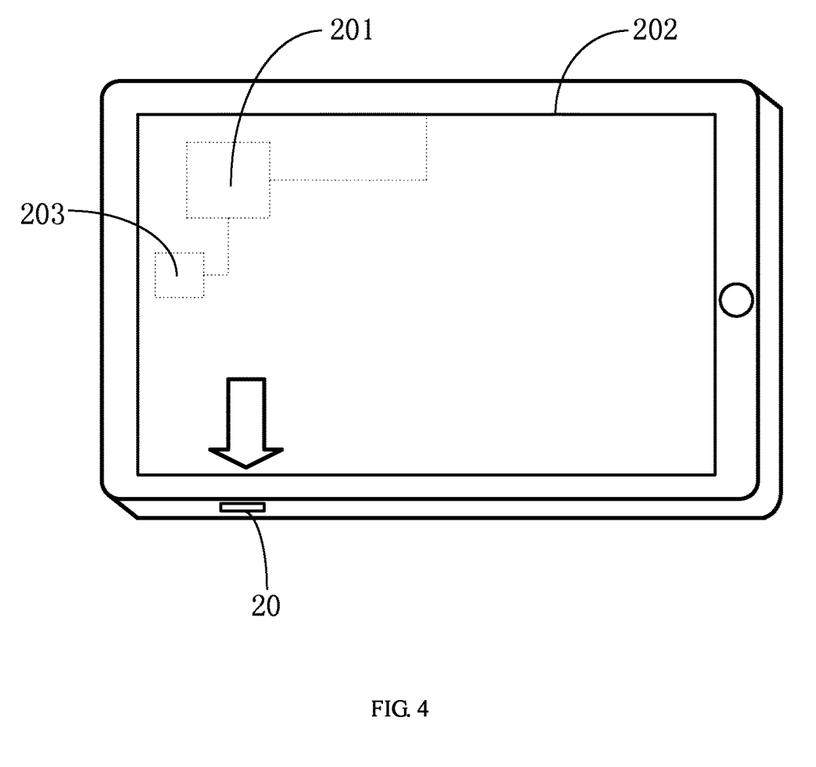
FIG. 4 is a second type of structural schematic diagram of the electronic apparatus according to Embodiment One of the present application.

As shown in FIG. 3 or FIG. 4, an electronic apparatus comprises: a first element 20; a sensor 203 for obtaining a posture of the electronic apparatus; a processor 201, connected to the sensor 203, for judging whether a predetermined posture of the electronic apparatus changes or not by the sensor to obtain a first judgment result, and generating a first prompt information for prompting a first position where the first element 20 is disposed, when the first judgment result indicates that the predetermined posture of the electronic apparatus has changed; an output device 202 connected to the processor 201, for outputting the first prompt information, to enable a user to determine the first position via the first prompt information, and to operate the first element 20.

In the specific implementation process, the electronic apparatus may be: a tablet PC, a smart phone, a digital camera and any other portable electronic apparatus. The embodiments of the present application do not specifically limit the specific type of the electronic apparatus.

Further, the first element 20 is specifically a power button, wherein, when the electronic apparatus is in a standby state, the user enables the electronic apparatus to enter into an operation state from the standby state by triggering the power button.

Further, the processor 201 is specifically for performing operations as follows: obtaining a first posture of the electronic apparatus by the sensor at a first moment; obtaining a second posture of the electronic apparatus by the sensor at a second moment after the first moment; judging whether the first posture is a first predetermined posture or not and whether the second posture is a second predetermined posture or not, to obtain the first judgment result; judging whether the electronic apparatus is in the standby state or not to obtain a second judgment result, when the first judgment result indicates that the first posture is the first predetermined posture and the second posture is the second predetermined posture; generating the first prompt information when the second judgment result indicates that the electronic apparatus is in the standby state.

Further, the processor 201 is further used for controlling the output device to output the first prompt information after the generation of the first prompt information.

Further, the sensor 203 is specifically: a gyroscope; and/or a gravity sensor.

In the specific implementation process, as shown in FIG. 3, the output device 202 is specifically at least one of a light emitting diode and a vibrator.

The light emitting diode is disposed in a second position of the electronic apparatus, and outputs the first light prompt information when the first prompt information is a first light prompt information, wherein, a first distance between the second position and the first position is equal to or less than a first predetermined distance.

The vibrator is disposed in a third position of the electronic apparatus, and outputs the first vibration prompt information when the first prompt information is a first vibration prompt information, wherein, a second distance between the third position and the first position is equal to or less than a second predetermined distance.

In the specific implementation process, as shown in FIG. 4, the output device 202 may further be a display screen which is embedded in the surface of the electronic apparatus. The display screen outputs the first image prompt information when the first prompt information is a first image prompt information.

In the specific implementation process, the first image prompt information may be: a light emitted a display unit on a display region adjacent to the first element; or as shown in FIG. 4, an "arrow" displayed on the display unit, the "arrow" pointing to the first element.

Hereinafter, an electronic apparatus 200 according to an embodiment of the present application is illustrated with reference to FIG. 5 and FIG. 6. The electronic apparatus 200 according to the embodiment of the present application includes: a display screen 210, a physical button 220, a sensor 230, and a display screen controlling means 240.

The physical buttons 220 may be disposed on a periphery of the electronic apparatus 200. FIG. 6 schematically shows an external view of an exemplary electronic apparatus 200. For example, a black-screen button is disposed on edge 1, and a volume button is disposed on edge 2 of the electronic apparatus.

The sensor 230 detects whether a predetermined touch operation is received in a predetermined position of the electronic apparatus or not. The sensor 230 may be a touch detector disposed in the predetermined position of the electronic apparatus, and the touch detector may be a capacitive sensor.

Preferably, the predetermined position may include at least one of: a periphery of the electronic apparatus, at least a portion of a rear surface of the electronic apparatus, upper and lower edges of the electronic apparatus, and right and left edges of the electronic apparatus.

Preferably, the predetermined touch operation may include at least one of a touch operation from left to right, a touch operation from right to left, a touch operation from top to bottom, and a touch operation from bottom to top.

However, the present application is not limited to the above predetermined positions and the above predetermined touch operations. Those skilled in the art may set other detection positions and touch movements as actually required, for example, a back-and-forth touch movement in a specific detection position, which is for example a touch movement from top to bottom and then from bottom to top, a touch movement from bottom to top and then top to bottom, a touch movement from left to right and then right to left, or a touch movement from right to left and then left to right in a specific detection position.

Preferably, the physical button includes at least one of: a volume button, a forward button and a backward button of a music player, a forward button and a backward button of radio.

When the sensor 230 detects that the predetermined touch operation is received in the predetermined position of the electronic apparatus, the display screen control means 240 displays a first display content on the display screen, the first display content being used for indicating a position of the physical button on the electronic apparatus.

The case that sensors are disposed on two long edges of the electronic apparatus is taken as an example to illustrate below.

For example, when a user watches a video with the electronic apparatus, after several random rotations, it is already very difficult to directly know the specific position of the volume buttons on the electronic apparatus. When the user wishes to adjust the volume, he/she may touch any of the long edges of the electronic apparatus from left to right, from right to left, from left to right and then from right to left, or from right to left and then left to right. When the electronic apparatus detects such touch operation by the user, it may display the first display content on the screen of the electronic apparatus, the first display content being used for indicating a position of the physical button on the electronic apparatus.

For example, the first display content may include an appearance display corresponding to the current state of the electronic apparatus and a position indication of the physical button on the electronic apparatus. For example, the appearance display and position indication of FIG. 6 may be taken as the first display content.

In this case, the first display content may be displayed as a transparent image overlapped on a current display content of the electronic apparatus. Alternatively, the first display content may substitute the current display content of the electronic apparatus. Also alternatively, the display screen of the electronic apparatus may be divided to include at least a first position and a second portion which do not overlap each other, wherein the first display content may be displayed on the first portion, and the current display content of the electronic apparatus may be displayed on the second portion. Also alternatively, the first display content may be displayed in a picture-in-picture (PIP) mode, i.e., the first display content is displayed on the predetermined portion of the display screen of the electronic apparatus, and the current display content of the electronic apparatus is displayed on the rest portion. Also alternatively, the current display content of the electronic apparatus may be displayed in the picture-in-picture (PIP) display mode, i.e., the current display content of the electronic apparatus is displayed on the predetermined portion of the display screen of the electronic apparatus, and the first display content is displayed on the rest portion.

As in another example, the first display content includes an indication mark for indicating the presence of the physical button at the edge corresponding to the physical button. Such an indication mark may include, for example, any combination of a box, a bubble, a text, a sound volume icon, a power icon, a wireless icon and the like, but the present application is not limited thereto.

In this case, the first display content may be displayed as a transparent image overlapped on the current display content of the electronic apparatus. Alternatively, the display screen of the electronic apparatus may be divided to include at least a first position and a second portion which do not overlap each other, wherein the first display content may be displayed on the first portion, and the current display content of the electronic apparatus may be displayed on the second portion. Specifically, the display screen of the electronic apparatus may be divided into two portions, in which the first portion is an outer-ring region of the display screen or a strip region of the edge (e.g., the right edge of the electronic apparatus) where the physical button is actually disposed on the electronic apparatus, and is used for displaying the first display content; and the second portion is the remaining portion on the display screen of the electronic apparatus, and is used for displaying the current display content of the electronic apparatus.

As described above, there may be a case that a false operation of the user is detected as the predetermined touch operation. Thus, for example, in a case that an operation of the physical button is not received after generation of the first display content, the display screen control means 240 controls the display screen to remove the first display content after a predetermined display duration. After the first display content is removed, the current display content of the electronic apparatus is displayed properly.

Furthermore, the electronic apparatus 200 according to the embodiment of the present application may adopt other detection modes. For example, when the physical button is a volume button, a volume detector is disposed in the electronic apparatus, an output volume saltation of the electronic apparatus is detected by the volume detector. In the case that the volume detector has detected the output volume saltation of the electronic apparatus, the first display content is displayed on the display screen, the first display content being used for indicating a position of the physical button on the electronic apparatus. The output volume saltation of the electronic apparatus includes at least one of: a volume starting from scratch, a volume from small to large and exceeding a first variation threshold value, and a volume from large to small and exceeding a second variation threshold value.

According to the embodiment of the present application, by means of detecting the predetermined touch movements in the predetermined positions, and generating and displaying the first display content used for indicating a position of the physical button on the electronic apparatus according to the predetermined touch movements, it may enable the user to simply know the specific position of the physical button without seeking the physical button edge by edge, and increase convenience of operation.

Figure 5:
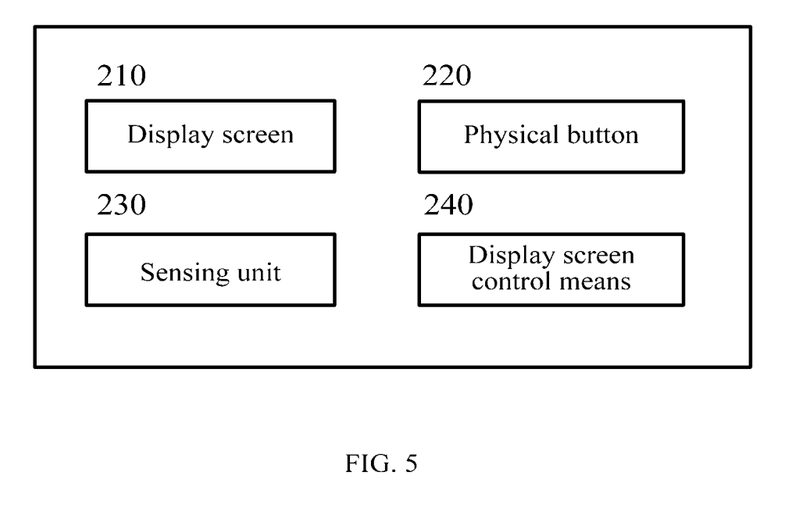
FIG. 5 schematically illustrates a block diagram of an electronic apparatus according to an embodiment of the present application.
Figure 6:
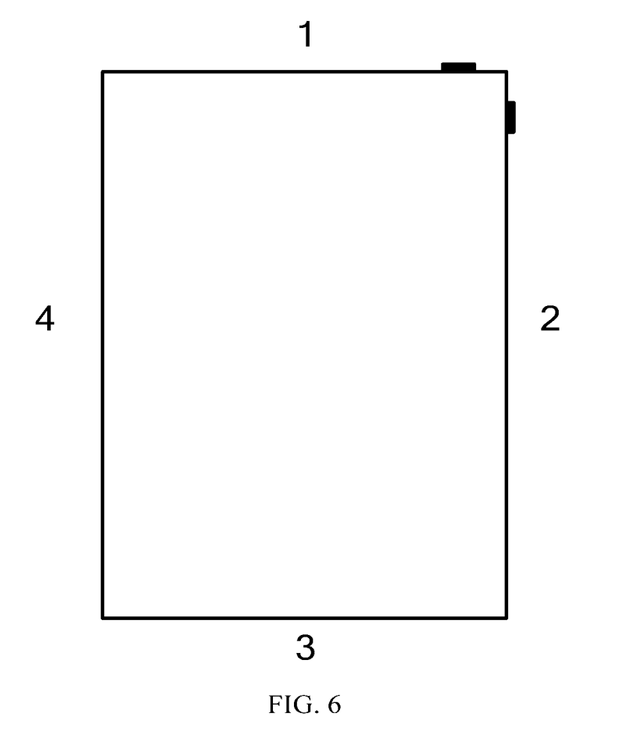
FIG. 6 schematically shows an external view of an exemplary electronic apparatus.

The first display content displayed by the electronic apparatus described in conjunction with FIG. 5 is also a prompt information. In the specific application, the electronic apparatus of FIG. 5 may be implemented by combination with the electronic apparatus of FIG. 2~FIG. 3. That is to say, respective elements of the electronic apparatus of FIG. 2 may execute the operations described in conjunction with FIG. 2 and FIG. 3 or have implementations described in conjunction with FIG. 2 and FIG. 3, and can further execute other operations or have other implementations. Specifically, the output device may be a display screen, the first element may be the physical button disposed in the periphery of the electronic apparatus; the sensor may further detect whether a predetermined touch operation is received in a predetermined position of the electronic apparatus; the processor may further include a display screen control means configured to display the first display content on the display screen when it detects that the predetermined touch operation is received in the predetermined position of the electronic apparatus, the first display content being used for indicating a position of the physical button on the electronic apparatus. Since the electronic apparatus introduced in the embodiment of the present application is the electronic apparatus adopted to implement the information prompt method according to the embodiments of the present application, those skilled in the art may conceive the specific embodiments of the electronic apparatus and various variations thereof based on the information prompt method according to the embodiments of the present application. Therefore, how the electronic apparatus implements the method according to the embodiments of the present application will no longer be described in detail. All the electronic apparatuses adopted by those skilled in the art during implementing the information prompt method according to the embodiments of the present application fall into the protection scope desired by the present application.

The above technical solutions according to the embodiments of the present application at least have technical effects or advantages as follows:

1. In the embodiments of the present application, an information prompt method is disclosed, which is applied to an electronic apparatus, the electronic apparatus at least including a first element and a sensor, and the method comprises: judging whether a predetermined posture of the electronic apparatus changes or not by a sensor to obtain a first judgment result; generating a first prompt information for prompting a first position where the first element is disposed, when the first judgment result indicates that the predetermined posture of the electronic apparatus has changed; outputting the first prompt information, to enable a user to determine the first position according to the first prompt information, and to operate the first element. Wherein, the electronic apparatus may be a tablet PC, and the first element may be a power button disposed on one side of the tablet PC, which thereby effectively solve the technical problem that the power button is not easily found by the user in the tablet PC in the prior art, achieve the technical effect of informing the user of the position of the power button by the first prompt information, so that the user can rapidly find the power button according to the first prompt information.

2. In the embodiments of the present application, the first prompt information is specifically: a first light prompt information output by a light-emitting unit and/or a first vibration prompt information output by a vibration unit and/or a first image prompt information output by a display unit disposed in the electronic apparatus, which, thereby, achieves the technical effect of bringing different prompt experiences to the user in terms of vision or touch, so that the user can find the power button according to the first prompt information more rapidly.

3. In the embodiments of the present application, by means of detecting the predetermined touch movements in the predetermined positions, and generating and displaying the first display content used for indicating a position of the physical button on the electronic apparatus according to the predetermined touch movements, it may enable the user to simply know the specific position of the physical button without seeking the physical button edge by edge, and increase convenience of operation by the user.

Those skilled in the art should understand that, the embodiments of the present application may provide a method, a system, or a computer program product. Therefore, the present application may be realized as a hardware embodiment, a software embodiment, or an embodiment combining software and hardware aspects. Moreover, the present application may adopt the form of computer program product which is implemented on one or more computer usable storage mediums (including, but not limited to, a magnetic storage device, a CD-ROM, an optical storage device, etc.) with computer usable program codes stored thereon.

The present application is described herein with reference to flowchart charts and/or block diagrams of methods, apparatuses (systems), and computer program products according to the embodiments of the invention. It should be understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor or a processor of other programmable data processing apparatus to form a machine, such that devices for implementing functions specified by one or more flows in a flowchart and/or one or more blocks in a block diagram may be generated by executing the instructions with the processor of the computer or other programmable data processing apparatus.

These computer program instructions may also be stored in a computer-readable memory that can direct a computer or other programmable data processing apparatus to function in a particular manner, such that the instructions stored in the computer-readable memory produce a manufactured article including an instruction device, the instruction device implementing the functions specified by one or more flows in a flowchart and/or one or more blocks in a block diagram.

These computer program instructions may also be loaded onto a computer or other programmable data processing apparatus, such that a series of process steps may be executed on the computer or other programmable data processing apparatus to produce process implemented by the computer, thereby, the instructions executed on the computer or other programmable data processing apparatus provide steps of the functions specified by one or more flows in a flowchart and/or one or more blocks in a block diagram.

Although the preferred embodiments of the present application have been described, once those skilled in the art know the basic inventive concept, they can make other variations and modifications to these embodiments. Therefore, the appended claims intend to be construed as including the preferred embodiments and all the variations and modifications that fall into the protection scope of the present application.

It is evident that one person skilled in the art can make various changes or modifications to the present application without departure from the spirit and scope of the invention. Thus, if these changes and modifications to the present application are within the scope of the claims of the present application and equivalent technologies, the present application also intends to include all such changes and modifications within its scope.

The invention claimed is:

1. An information prompt method applied to an electronic apparatus including at least a physical button and a sensor, the method comprising:
    obtaining a first judgment result by judging with the sensor whether a predetermined posture of the electronic apparatus changes;
    generating a first prompt information to prompt a first position where the physical button is disposed, when the first judgment result indicates that the predetermined posture of the electronic apparatus has changed;
    outputting the first prompt information to indicate the first position according to the first prompt information, wherein the first prompt information is a light emitted by a display unit disposed in the electronic apparatus on a display region adjacent to the physical button;
    obtaining a second judgment result by judging with the sensor whether a redetermined touch movement is received in a redetermined position of the electronic apparatus by a user;
    generating a first display content as the first prompt information in response to receiving the predetermined touch movement in the predetermined position of the electronic apparatus, the first display content indicates the first position of the physical button on the electronic apparatus for the user to operate the physical button.

2. The method according to claim 1, wherein the physical button is a power button and when the electronic apparatus is in a standby state, in response to a user input to trigger the physical button, enabling the electronic apparatus to enter an operation state from the standby state.

3. The method according to claim 1, wherein the obtaining the first judgment result includes:
    obtaining a first posture of the electronic apparatus by the sensor at a first moment;
    obtaining a second posture of the electronic apparatus by the sensor at a second moment after the first moment; and
    judging whether the first posture is a first predetermined posture or not and whether the second posture is a second predetermined posture or not, to obtain the first judgment result.

4. The method according to claim 3, wherein, the generating the first prompt information further includes:
    judging whether the electronic apparatus is in the standby state or not to obtain a third judgment result when the first judgment result indicates that the first posture is the first predetermined posture and the second posture is the second predetermined posture;
    generating the first prompt information when the third judgment result indicates that the electronic apparatus is in the standby state.

5. The method according to claim 1, wherein the first prompt information is at least one of:
    a first light prompt information output by a light-emitting unit disposed in a second position, a first distance between the second position and the first position being equal to or less than a first predetermined distance;
    a first vibration prompt information output by a vibration unit disposed in a third position, a second distance between the third position and the first position being equal to or less than a second predetermined distance; and
    a first image prompt information output by the display unit disposed in the electronic apparatus.

6. The method according to claim 1, wherein the sensor is a touch sensor and wherein,
    the predetermined position includes at least one of a periphery of the electronic apparatus, at least a portion of a rear surface of the electronic apparatus, upper and lower edges of the electronic apparatus, and right and left edges of the electronic apparatus; and
    the predetermined touch movement includes at least one of a touch movement from left to right, a touch movement from right to left, a touch movement from top to bottom, and a touch movement from bottom to top.

7. The method according to claim 1, wherein the first display content includes an appearance display corresponding to a current state of the electronic apparatus and a position indication of the physical button on the electronic apparatus.

8. The method according to claim 1, further comprising removing the first display content after a predetermined display duration, when an operation of the physical button is not received after generating the first display content.

9. The method according to claim 1, wherein, changing of the predetermined posture is that the electronic apparatus changes to move from stillness.

10. An electronic apparatus, comprising:
    a physical button disposed in a periphery of the electronic apparatus;
    a sensor for obtaining a posture of the electronic apparatus and detecting a touch movement by a user;
    a processor connected to the sensor and configured to:
    judge with the sensor whether a predetermined posture of the electronic apparatus changes to obtain a first judgment result;
    generate a first prompt information to prompt a first position where the physical button is disposed, when the first judgment result indicates that the predetermined posture of the electronic apparatus has changed;
    obtain a second judgment result by judging with the sensor whether a predetermined touch movement is received in a predetermined position of the electronic apparatus by the user; and
    generate a first display content as the first prompt information in response to receiving the predetermined touch movement in the predetermined position of the electronic apparatus, the first display content indicates the first position of the physical button on the electronic apparatus for the user to operate the physical button; and an output device connected to the processor and configured to:

output the first prompt information to indicate the first position according to the first prompt information, wherein the first prompt information is alight emitted by a display unit disposed in the electronic apparatus on a display region adjacent to the physical button.

11. The electronic apparatus according to claim 10, wherein the physical button is a power button and when the electronic apparatus is in a standby state, in response to a user input to trigger the physical button, the processor enables the electronic apparatus to enter an operation state from the standby state.

12. The electronic apparatus according to claim 11, wherein the processor is configured to:

obtain a first posture of the electronic apparatus by the sensor at a first moment;

obtain a second posture of the electronic apparatus by the sensor at a second moment after the first moment;

judge whether the first posture is a first predetermined posture and whether the second posture is a second predetermined posture to obtain the first judgment result;

judge whether the electronic apparatus is in the standby state to obtain a third judgment result, when the first judgment result indicates that the first posture is the first predetermined posture and the second posture is the second predetermined posture;

generate the first prompt information, when the third judgment result indicates that the electronic apparatus is in the standby state.

13. The electronic apparatus according to claim 12, wherein, the processor is further configured to control the output device to output the first prompt information after the generating the first prompt information.

14. The electronic apparatus according to claim 10, wherein the output device is at least one of:

a light-emitting diode disposed in a second position of the electronic apparatus, outputting a first light prompt information when the first prompt information is the first light prompt information, wherein, a first distance between the second position and the first position is equal to or less than a first predetermined distance;

a vibrator, disposed in a third position of the electronic apparatus, outputting a first vibration prompt information when the first prompt information is the first vibration prompt information, wherein, a second distance between the third position and the first position is equal to or less than a second predetermined distance; and a display screen, embedded in a surface of the electronic apparatus, outputting a first image prompt information when the first prompt information is the first image prompt information.

15. The electronic apparatus according to claim 10, wherein, the sensor is a touch detector disposed in the predetermined position of the electronic apparatus;

the predetermined position includes at least one of the periphery of the electronic apparatus, at least a portion of a rear surface of the electronic apparatus, upper and lower edges of the electronic apparatus, and right and left edges of the electronic apparatus; and the predetermined touch movement include at least one of a touch movement from left to right, a touch movement from right to left, a touch movement from top to bottom, and a touch movement from bottom to top.

16. The electronic apparatus according to claim 10, wherein the first display content includes an appearance display corresponding to a current state of the electronic apparatus and a position indication of the physical button on the electronic apparatus.

17. The electronic apparatus according to claim 10, wherein the processor controls the display screen to remove the first display content after a predetermined display duration, when an operation of the physical button is not received after generating the first display content.

18. The electronic apparatus according to claim 10, wherein changing of the predetermined posture is that the electronic apparatus changes to move from stillness.

* * * * *